US009161611B2

(12) United States Patent
Wu (10) Patent No.: US 9,161,611 B2
(45) Date of Patent: Oct. 20, 2015

(54) PROTECTIVE CASE ADAPTED FOR USE ON TABLET MOBILE DEVICES

(75) Inventor: Da-chung Wu, Taipei (TW)

(73) Assignee: TAER INNOVATION CO., LTD., New Taipei (TW)

( * ) Notice: Subject to any disclaimer, the term of this patent is extended or adjusted under 35 U.S.C. 154(b) by 0 days.

(21) Appl. No.: 13/572,651

(22) Filed: Aug. 11, 2012

(65) Prior Publication Data

US 2013/0113229 A1    May 9, 2013

(30) Foreign Application Priority Data

Aug. 12, 2011    (TW) .............................. 100128916 A (51) Int. Cl.
*A45F 5/10*    (2006.01)
*B65D 85/00*    (2006.01)
*H04M 1/04*    (2006.01)

(52) U.S. Cl.
CPC ... *A45F 5/10* (2013.01); *H04M 1/04* (2013.01)

(58) Field of Classification Search
CPC ... A45C 2013/025; G06F 1/1628; A45F 5/00; A45F 5/10; H04M 1/04
USPC .......... 206/305, 320; 220/752, 755, 768, 769; 294/137–139, 172
See application file for complete search history.

(56) References Cited

U.S. PATENT DOCUMENTS

| | | | | |
|---|---|---|---|---|
| 5,484,063 A * | 1/1996 | Cuccio et al. | ................. | 206/320 |
| 5,632,373 A * | 5/1997 | Kumar et al. | ................. | 206/320 |
| 6,995,976 B2 * | 2/2006 | Richardson | ................... | 206/320 |
| 8,016,107 B2 * | 9/2011 | Emsky | .......................... | 206/320 |
| 8,281,924 B2 * | 10/2012 | Westrup | ........................ | 206/320 |
| 2009/0032421 A1 * | 2/2009 | Sween et al. | .................. | 206/320 |
| 2010/0200456 A1 * | 8/2010 | Parkinson | ..................... | 206/701 |
| 2011/0036876 A1 * | 2/2011 | Fathollahi | ..................... | 224/191 |
| 2011/0136555 A1 * | 6/2011 | Ramies et al. | ............. | 455/575.8 |
| 2011/0233078 A1 * | 9/2011 | Monaco et al. | ............... | 206/223 |

FOREIGN PATENT DOCUMENTS

CN    201926959 U    8/2011
KR    200453559    5/2011

* cited by examiner

*Primary Examiner* — Luan K Bui

(74) *Attorney, Agent, or Firm* — Li & Cai Intellectual Property (USA) Office (57) ABSTRACT

A protective case is for use on a tablet mobile device. The tablet mobile device has a front face, rear face and four side faces connecting the front face. The protective case comprises a frame body comprising a bottom portion for supporting the rear face and a holding portion extending from the bottom portion and at least partially bent for lying on the front face; a sealing member comprising an assistant holding portion and for surrounding and holding, in cooperation with the frame body, the tablet mobile device; and a handle member mounted on the frame body and/or the sealing member. The protective case has the advantages of having a simple structure for convenient installation and protecting the exterior of the computer without hiding its display screen. Additionally, the handle member adapts an ergonomic design by using user's arm as support for the computer.

3 Claims, 16 Drawing Sheets

PROTECTIVE CASE ADAPTED FOR USE ON TABLET MOBILE DEVICES

FIELD OF THE INVENTION

The present invention generally relates to a protective case adapted for use on a tablet mobile device, and more particularly, to a protective case adapted for use on a tablet mobile device and integrated with multiple functions, such as portability, handheld ability and protection ability.

DESCRIPTION OF THE RELATED ART

With fast advance in computer technologies, from the revolution of touch-screen technologies, the development of application software, the innovation of display devices and the expansibility of computer memory capacity, the computer-related industries have continued to flourish, especially the industry of portable electronic devices. The results of this vigorous development are the emergence of portable tablet mobile devices, which are progressively making their way into the mainstream market. Following the dynamic improvement in functionalities of those electronic devices, the prices thereof rise substantially. For such a valuable product, it brings up the concerns regarding the products' durability. Users would pay more attentions on those expensive gadgets when carrying around or in use; at the same time, they are more willing to purchase protective means to make sure their gadgets remain pristine.

A conventional protective case is commonly used to protect a portable tablet mobile device from scratches and damage, to provide visual comfort, as well as to improve convenience and safety in carrying and handling. A portable tablet mobile device may get scratched or damaged easily on its surface from everyday use, especially in outdoors. The touch-screen of the tablet mobile device is extremely vulnerable to damage. Even a slight bumping on the screen could have negative effects on the touch-screen sensitivity, and may shorten the life of the product and increase repair costs. Additionally, to hold a tablet mobile device, a user would either use both hands when reading or one hand while interacting with the touch-screen by the other hand. The user might inevitably drop the computer due to the slick exterior of the device. Particularly, after holding the streamline-shaped tablet mobile device for a long period of time, the user with tired or sweaty hands would have difficulty to properly grip the computer at the point of application. As a consequence, it is inconvenient for carrying and using the tablet mobile device, defeating the purpose of portability.

Figure 1:
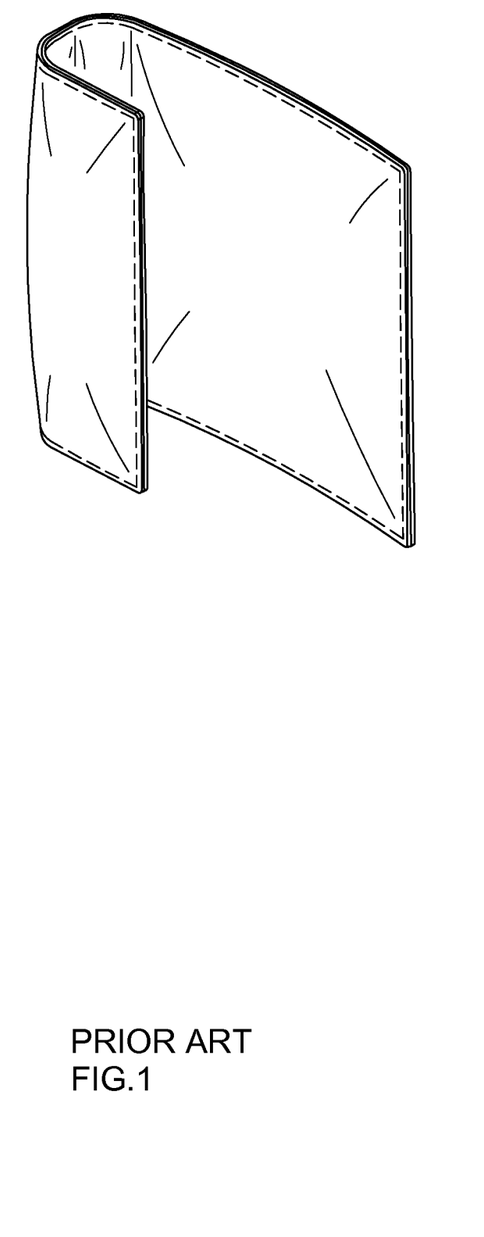
FIG. 1 is a schematic diagram illustrating a conventional handle device adapted for used on a tablet mobile device.

Unfortunately, there is little development in the art of protective cases used on tablet mobile devices focusing on their handling function. Most conventional protective cases provide an insulation shell body to prevent the tablet mobile device from damage caused by bumping. For example, FIG. 1 shows a U-shaped clip body mounted on the outside of a tablet mobile device, but this design has not offered any improvement over the aforementioned considerations, such as ease of carrying or adequate protection while it is in outdoor use.

Figure 2:
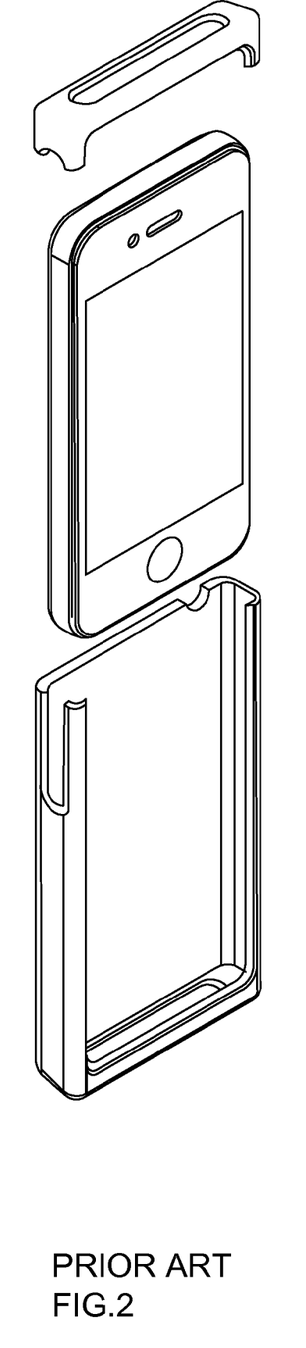
FIG. 2 is a schematic diagram illustrating a conventional protective case adapted for use on a tablet mobile device.
Figure 3:
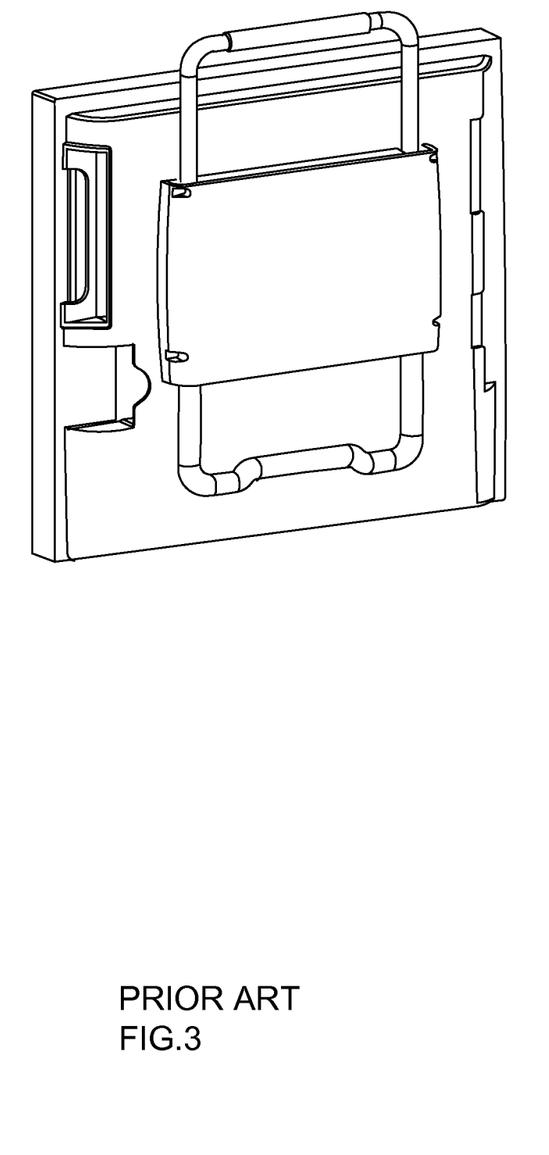
FIG. 3 is a schematic diagram illustrating a conventional support stand for a tablet mobile device.

In another aspect, some conventional protective cases are too complicated in configuration. As shown in FIG. 2, a protective case wraps around a back face and four side faces of an electronic device to the extent that hides parts of the front face screen. As such, the display quality has been compromised. Furthermore, as shown in FIG. 3, in order to allow users to experience an adequate and conformable viewing angle, a stand is utilized to hold the tablet mobile device and to adjust the overall height and angle of the device. However, the geometry of the stand would significantly increase overall bulk of the tablet mobile device, several sharp and protruding edges of which may easily knock into surroundings, thus giving rise to inconvenience to its users.

A growing trend in the art of protective cases is that not only are greater functions of a protective case highly desirable, but its overall size and structure also needs to be exquisite and simple enough to enable convenient use. Advantageously, a protective case may come with a proper ergonomic design. Therefore, there is an actual market demand for a multifunctional protective case with simplicity, high portability and transport convenience.

SUMMARY OF THE INVENTION

Accordingly, an object of the present invention is to provide a protective case, which is employed to protect the exterior of a tablet mobile device and secure the body of the tablet mobile device.

Another object of the invention is to provide a protective case adapted for use on a tablet mobile device, which is simple in structure so that users are capable of installing the frame.

It is still another object of the invention is to provide a protective case adapted for use on a tablet mobile device, which is employed to hold the tablet mobile device from its side faces by virtue of a bottom portion and a holding portion, thereby reducing hidden areas of the computer's screen by the protective case.

It is still another object of the invention is to provide a protective case adapted for use on a tablet mobile device, which allows a user to hold the tablet mobile device in an ergonomically comfortable position by leaning against the user's arm for supporting.

It is still another object of the invention is to provide a protective case adapted for use on a tablet mobile device, which is convenient for carrying.

The present invention therefore provides a protective case adapted for use on a tablet mobile device. The tablet mobile device has a front face for displaying images, a rear face opposite to the front face, and four side faces connecting the front face and the rear face. The protective case comprises a frame body, which comprises a bottom portion for supporting the rear face, and at least one holding portion extending from the bottom portion and at least partially bent for lying on the front face; a sealing member comprising at least one assistant holding portion and adapted for surrounding and holding, in cooperation with the frame body, the tablet mobile device; and a handle member mounted on the frame body and/or sealing member.

The protective case disclosed herein is so perforated at its front and rear faces that it provides protection to a tablet mobile device by surrounding the side faces of the tablet mobile device in the form of a frame. The handle member is not only ergonomically designed for placement of the computer on one's arm or on table, but also can be adjusted and retained at an inclined angle, such as at 90- or 180-degree, relative to the frame body, thereby providing a user with remarkable experiences during use. In addition, the protective case may be perforated, so that only the four side faces of the tablet mobile device are framed. Furthermore, the protective case could utilize light weight materials, for example, aluminum alloy or carbon fiber, thus lightening a user's carrying load. In summary, the protective case of the present invention provides primary functions that a user wants to have at once for his tablet mobile device, including protection, ease of storage, high portability, convenience for handling and viewing angle adjustability.

BRIEF DESCRIPTION OF THE DRAWINGS

The above and other objects, features and effects of the invention will become apparent with reference to the following description of the preferred embodiments taken in conjunction with the accompanying drawings, in which.

DETAILED DESCRIPTION OF THE INVENTION

Figure 4:
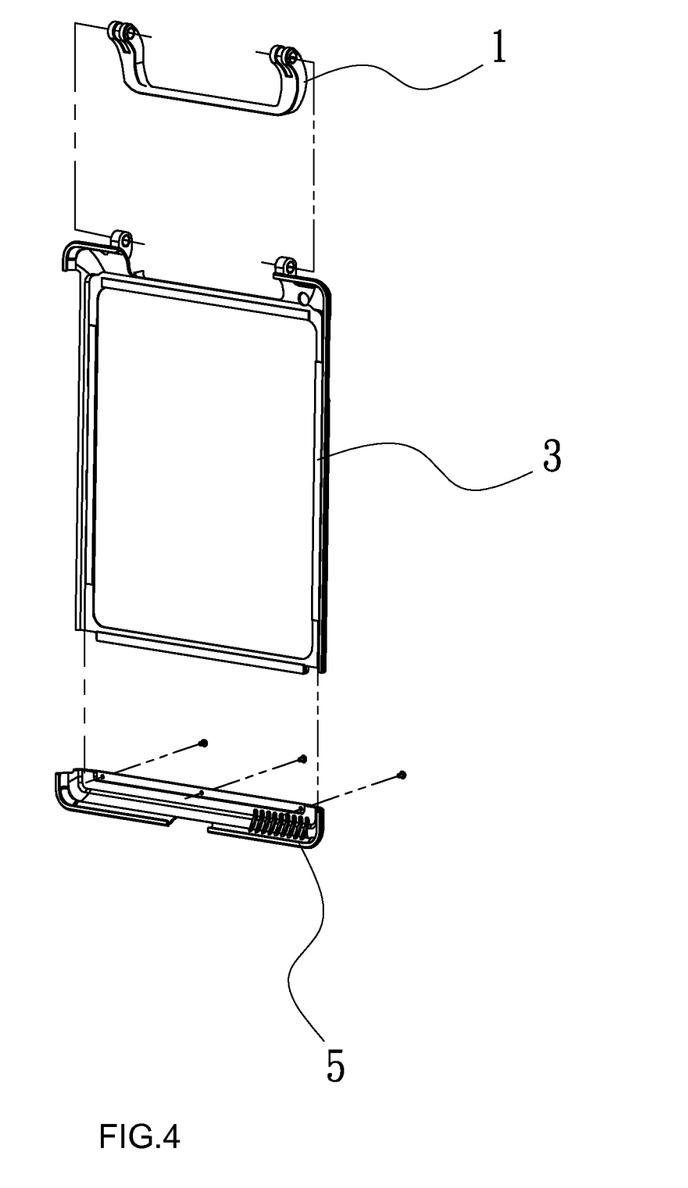
FIG. 4 is an exploded diagram of the first preferred embodiment of the invention.

The present invention is related to a protective case adapted for use on a tablet mobile device. FIG. 4 is an exploded diagram showing a protective case according to the first preferred embodiment of the invention. In this embodiment, the protective case primarily comprises three members: a handle member 1 illustrated at the upper part of FIG. 4, a frame body 3 illustrated at the middle part of FIG. 4, and a sealing member 5 illustrated at the lower part of FIG. 4.

Figure 5:
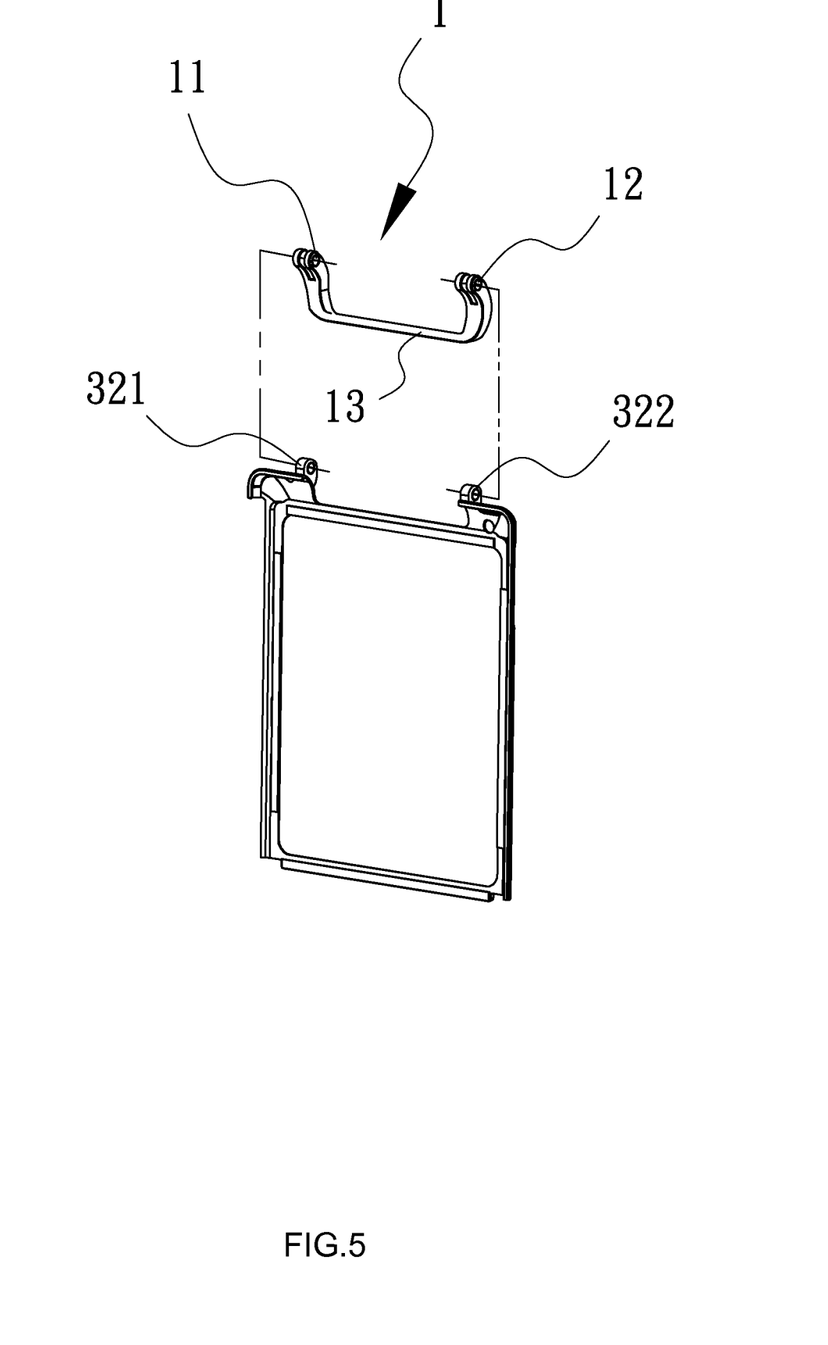
FIG. 5 is a schematic diagram illustrating a handle member according to the first preferred embodiment of the invention.
Figure 6:
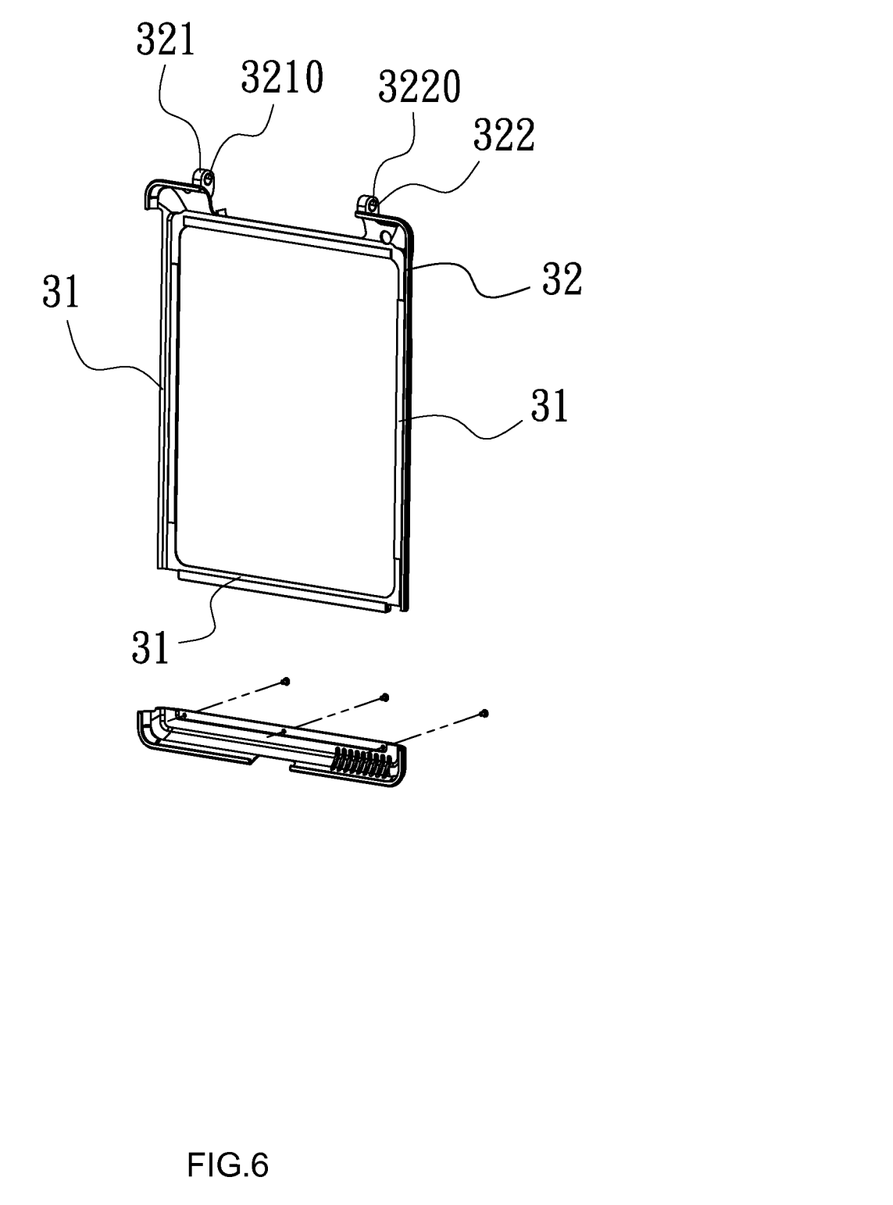
FIG. 6 is a schematic diagram illustrating a frame body according to the first preferred embodiment of the invention.
Figure 7:
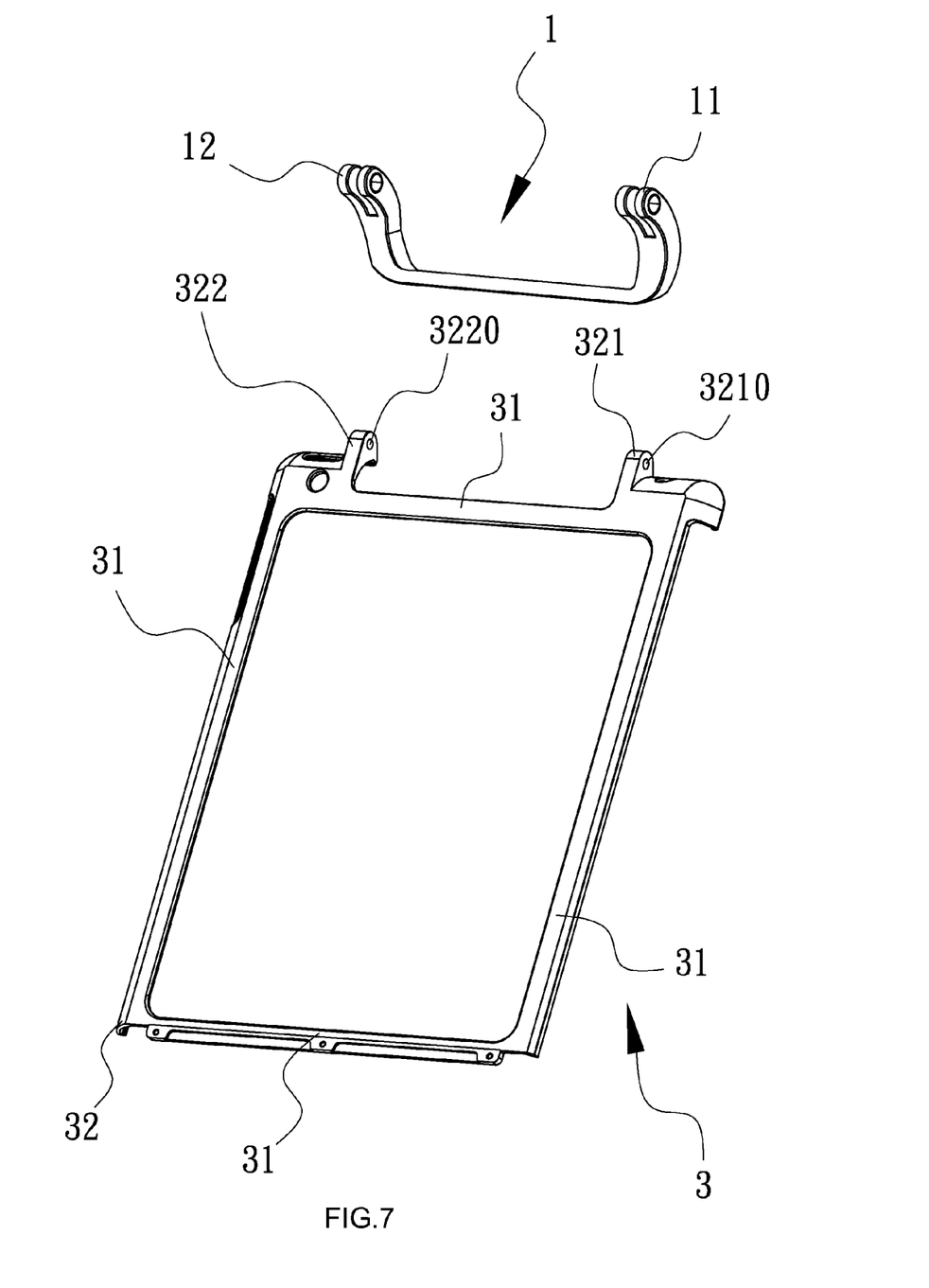
FIG. 7 is a schematic diagram illustrating the relation between the frame body and the handle member according to the first preferred embodiment of the invention.

The following diagrams illustrate the assembling of the protective case according to this embodiment, as well as the detailed structures of the three primary members and their connections in relation to one another. According to this embodiment shown in FIGS. 5, 6 and 7, the handle member 1 comprises a handle part 13 and hinge parts 11 and 12 for pivotal connection to the frame body 3. As shown in FIG. 6, the frame body 3 primarily comprises a bottom portion 31 made of metallic material, and a holding portion 32 extending from the front edge of the bottom portion 31 and having a free end bent forwardly in a curved shape. In this embodiment, the right side of the holding portion 32 is of a strip-shaped structure extending along and throughout the length of the right side of the bottom portion 31. On the other hand, as shown in FIG. 7, the upper right side and upper left side of the holding portion 32 extend upward from the corresponding upper right side and the upper left side of the bottom portion 31, respectively, thereby forming a pair of tabs 321 and 322 formed with a through hole 3210 or a through hole 3220, respectively. The through holes 3210 and 3220 are coaxially arranged with each other, so as to permit engagement of the respective tabs 321 and 322 with the respective hinge parts 11, 12 of the handle member 1. The frame body 3 is coupled to the handle member 1 accordingly.

Figure 8:
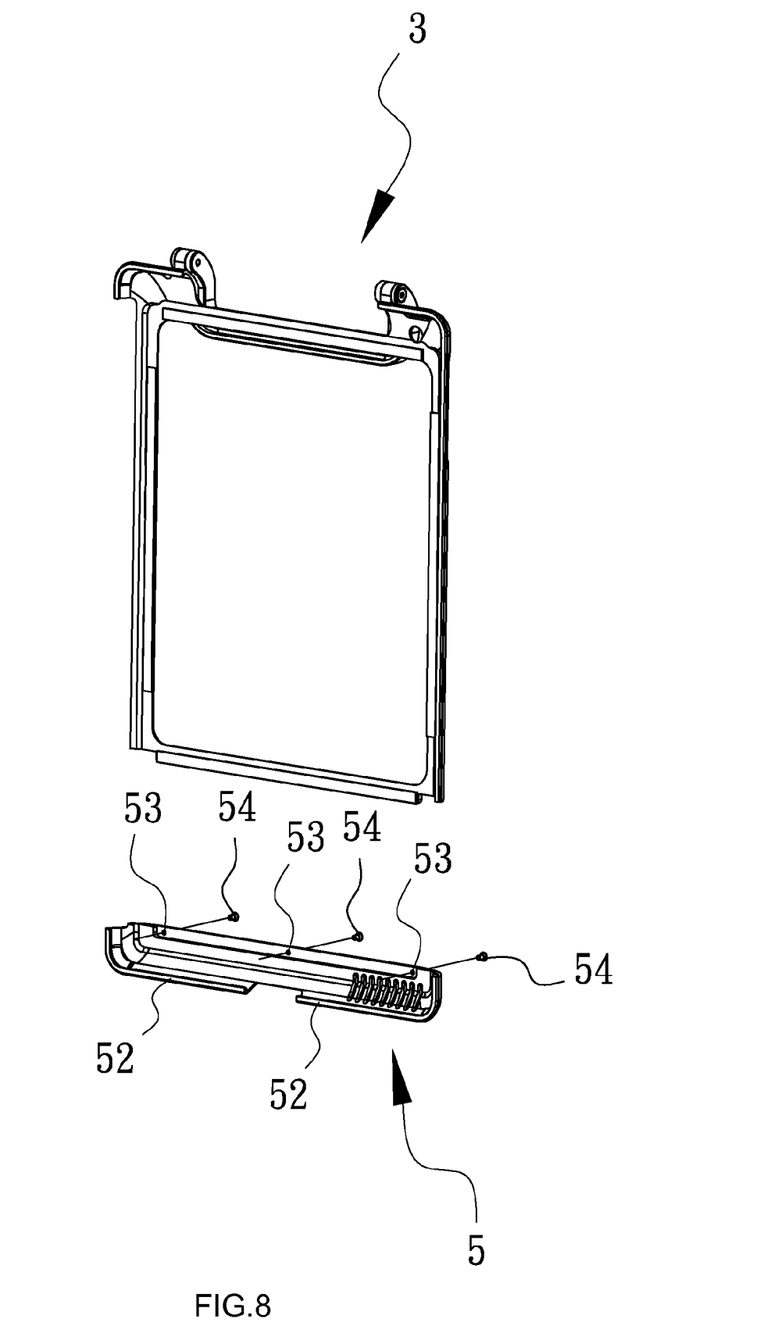
FIG. 8 is a schematic diagram illustrating the structure of the sealing member according to the first preferred embodiment of the invention.
Figure 9:
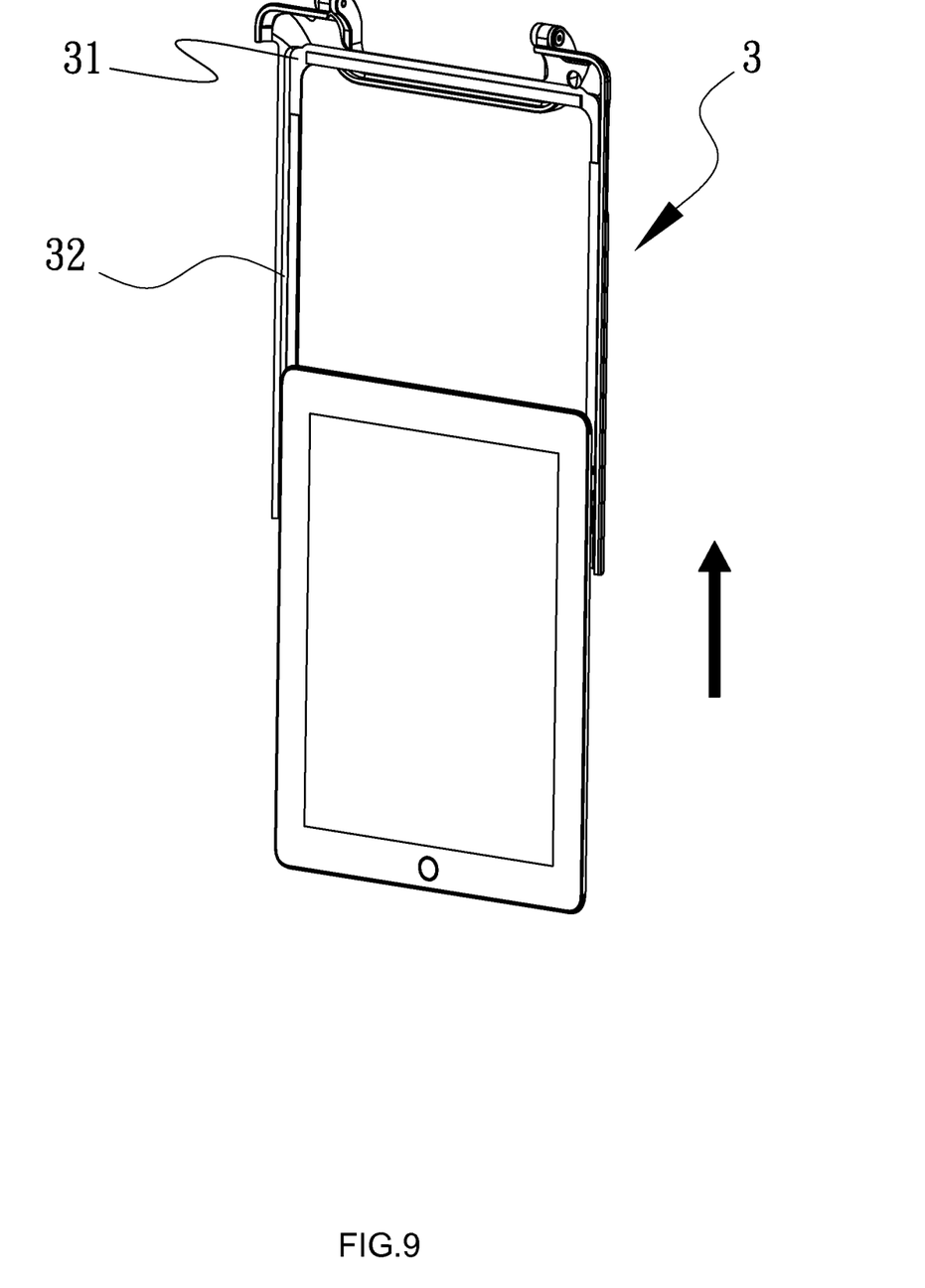
FIG. 9 is a schematic diagram illustrating the operation of the protective case according to the first preferred embodiment of the invention.
Figure 10:
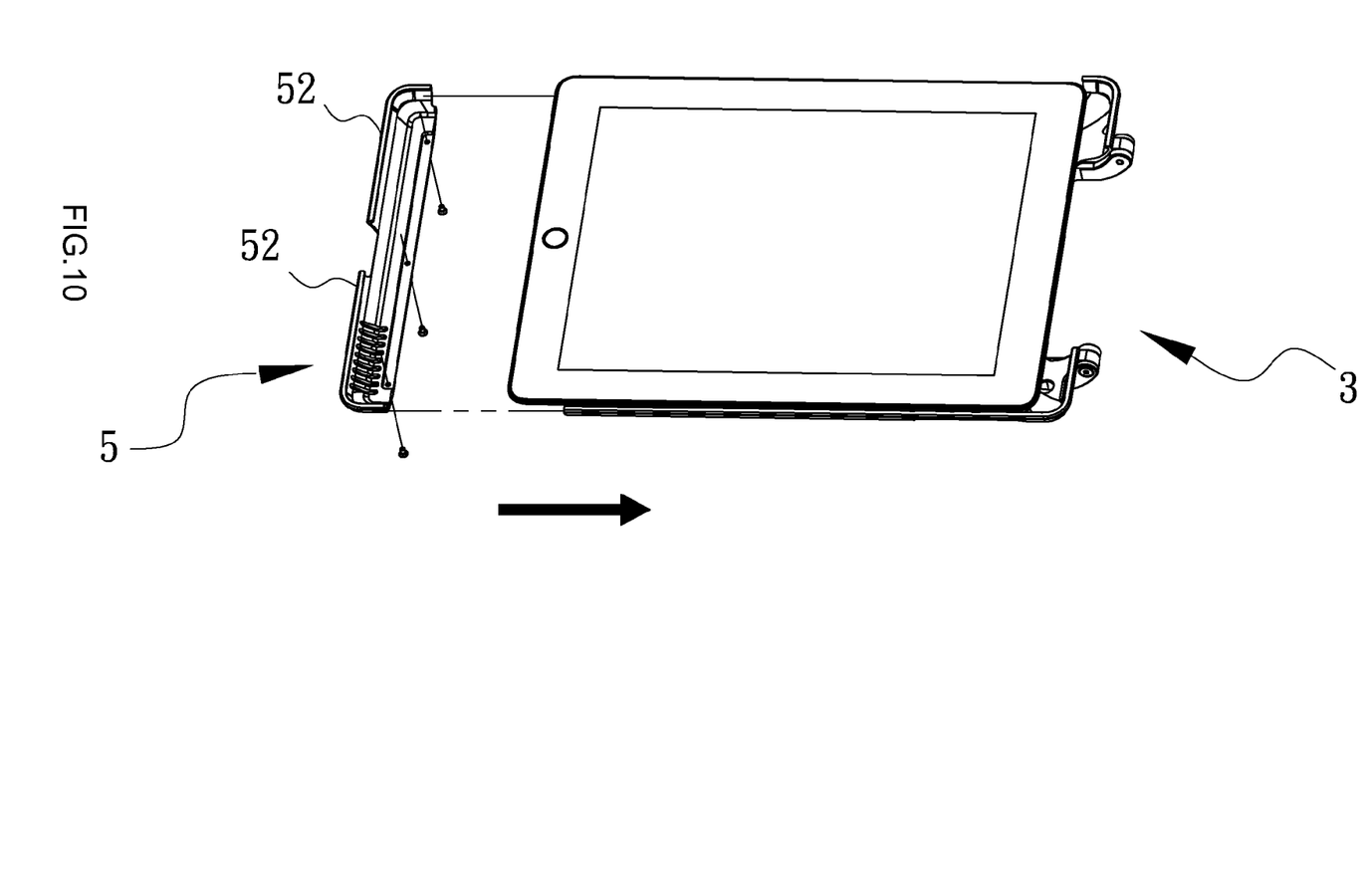
FIG. 10 is another schematic diagram illustrating the operation of the protective case according to the first preferred embodiment of the invention.

As illustrated in FIG. 8, the lowest part of the entire configuration of the protective case according to this embodiment is the sealing member 5, which primarily comprises an assistant holding portion 52, threaded holes 53 formed on the body of the sealing member 5, and screws 54. Now referring to both FIGS. 9 and 10, when the side faces of the tablet mobile device are stepwise fitted into the holding portion 32 and the bottom portion 31 of the frame body 3, the tablet mobile device could only be moved in the horizontal direction and could not be withdrawn from the protective case. Thereafter, the sealing member 5 is assembled to the lower part of the frame body 3. Consequently, the assistant holding portion 52 and the holding portion 32, along with the bottom portion 31, together constitute a closed frame body that surrounds and holds the tablet mobile device. Finally, the screws 54 pass through the corresponding through holes on the frame body 3 (not shown) and are inserted into the threaded holes 53 to complete the forgoing assembling process.

Figure 11:
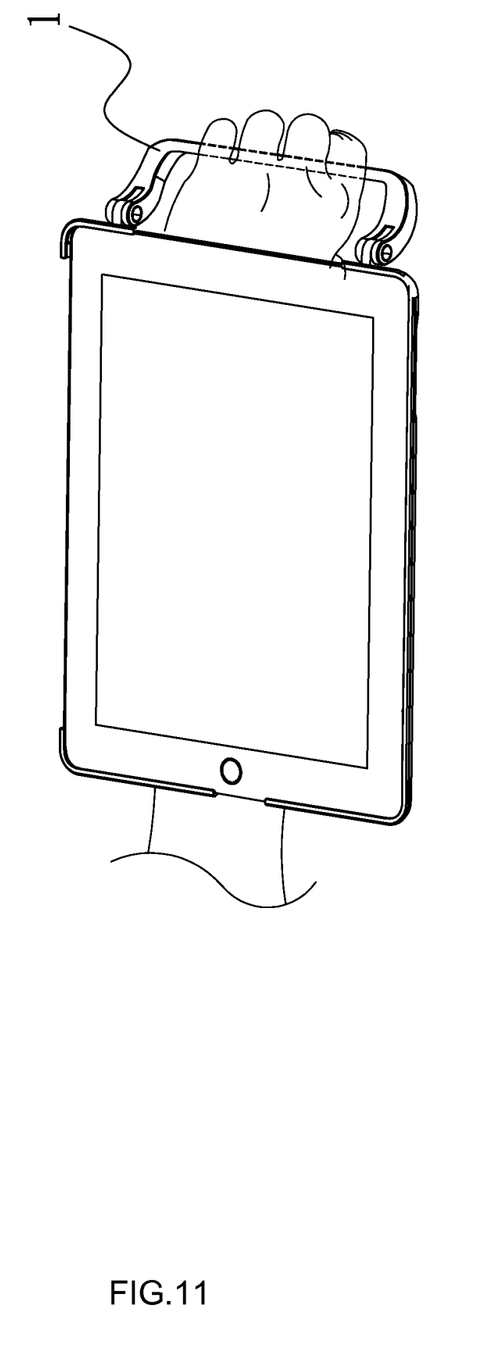
FIG. 11 is a schematic diagram showing that the protective case according to the first preferred embodiment of the invention is held by hand.

In this embodiment, the handle member is integrated with the frame body and the sealing member via the tabs, thereby functioning as a carrying means for convenience of hand carrying. Optionally and preferably, the through holes 3210, 3220 shown in FIG. 7 are formed on the inner walls thereof with protrusions (not shown). These protrusions are engageable with recesses (not shown) formed on outer surfaces of the hinge parts 11, 12, so that the handle member can be adjusted and retained at an inclined angle relative to the frame body as per the user's desire. As shown in FIG. 11, a user might alternately grip the handle member 1 of the protective case, as a shield, and place the computer in the outside of his lower arm with the display screen facing the user in a way similar to one wearing a large wristwatch so that the user could use the computer while holding the protective case. As such, the handle member 1 may perform stability function by allowing a user to utilize their arms to support the tablet mobile device. Furthermore, benefited from the adjustability of the handle member 1, a user is able to adapt a convenient and comfortable handling position in lights of different environmental limitations.

When a user wants to carry and transport the tablet mobile device after using the tablet mobile device on his arm, additional operations of the protective case are not required. The user only needs to lay down his arm, which is followed by spontaneously pivotal rotation of the tablet mobile device about the hinges/tabs axis, enabling the display screen of the tablet mobile device to face towards the user's thigh; therefore, in one aspect, an excellent handling function is achieved; in another, the vulnerable front face of the tablet mobile device is given a better protection.

Figure 12:
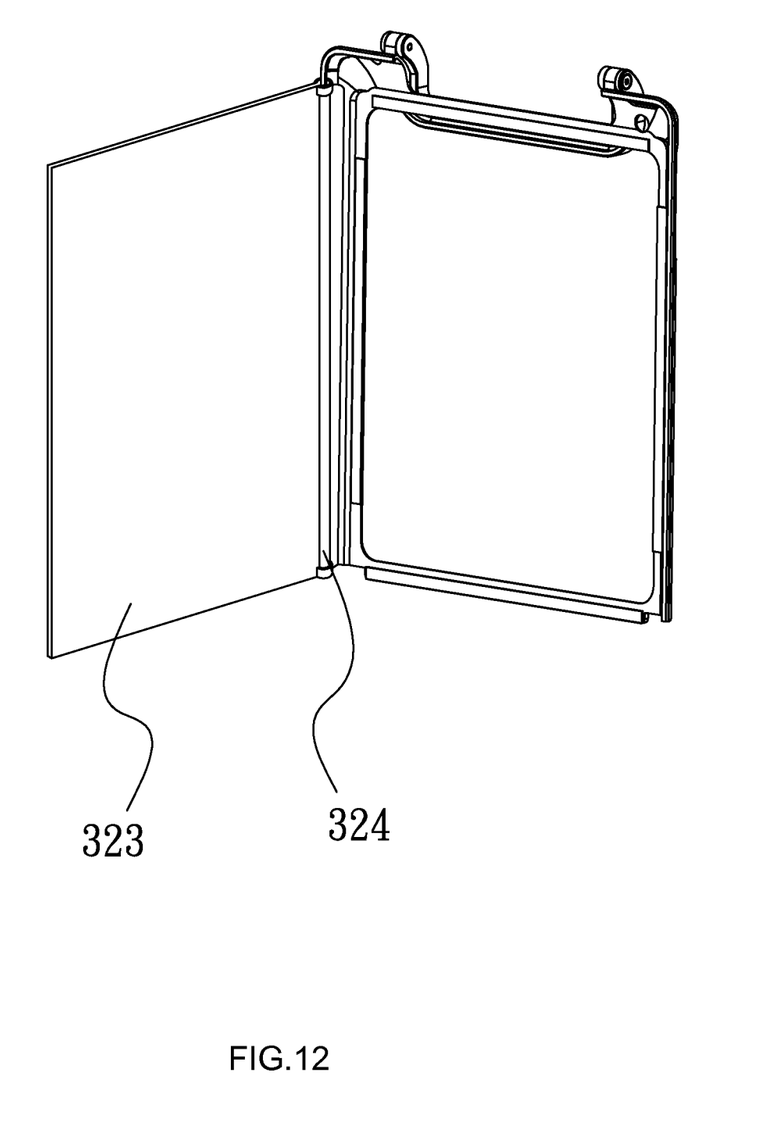
FIG. 12 is a schematic diagram illustrating a protective sheet installed on the protective case according to the second preferred embodiment of the present invention.

FIG. 12 depicts the second preferred embodiment of the present invention. A rotatable shaft 324 is interposed between the holding portion 32 of the frame body 3 and the assistant holding portion 52 of the sealing member 5. The shaft 324 is fixed with a protective sheet 323, with which the display screen of the tablet mobile device, while not in use, can be covered to prevent scratches or damage caused by bumping or friction. While in use, the display screen can be revealed by uncovering the protective sheet.

Figure 13:
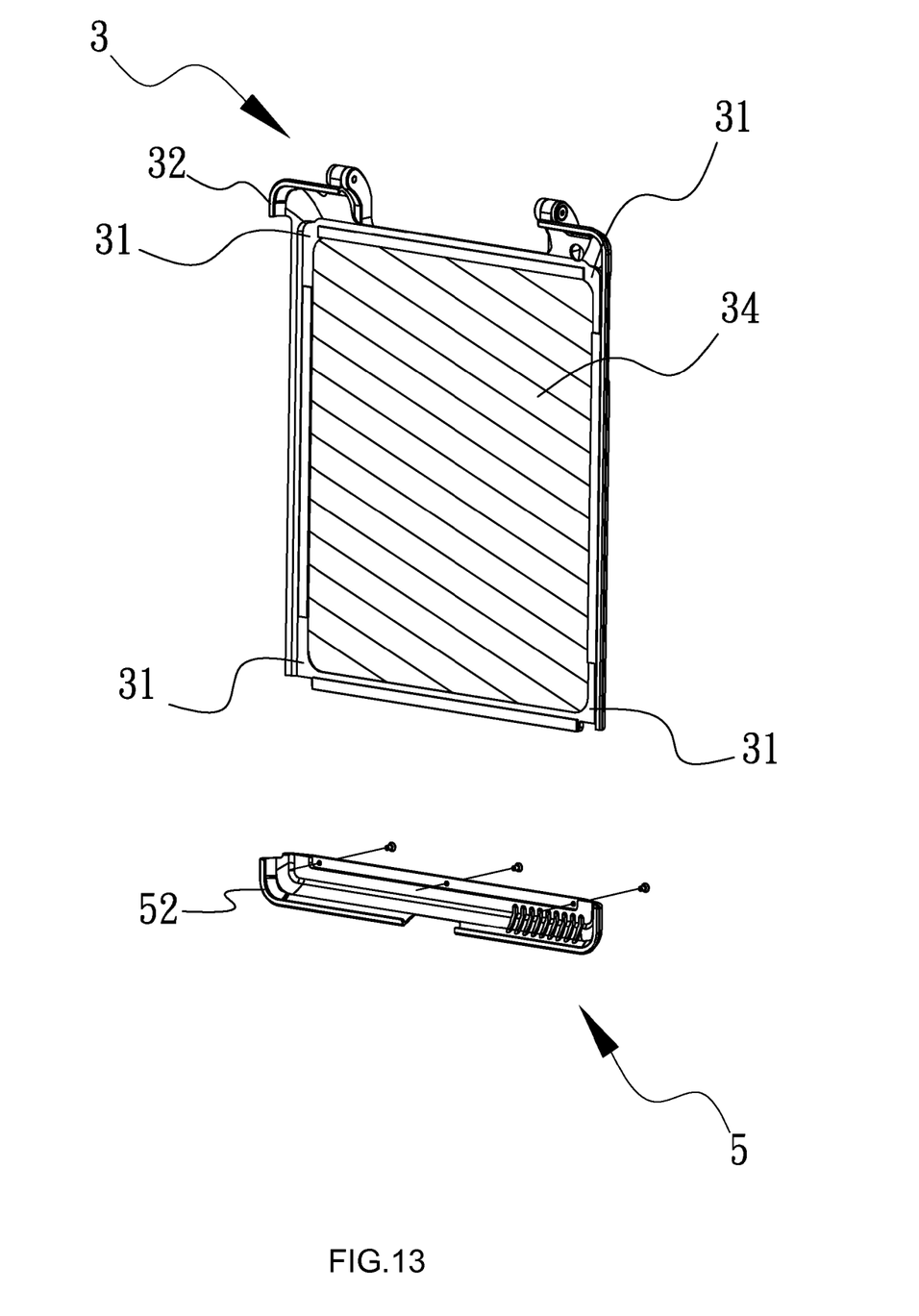
FIG. 13 is a schematic diagram illustrating a soft pad installed on the protective case according to the invention.

According to the second embodiment of the invention as shown in FIG. 13, the bottom portion 31 of the frame body 3 is formed with a perforated region. Such design not only reduces consumption of materials for the frame body 3 and the costs wherefrom but also significantly reduces weights of the protective case. Optionally, a soft pad 34 may be placed at the bottom portion 31 corresponding to the rear face of the tablet mobile device so as to protect the rear face from scratches and damage caused by bumping or friction.

Figure 14:
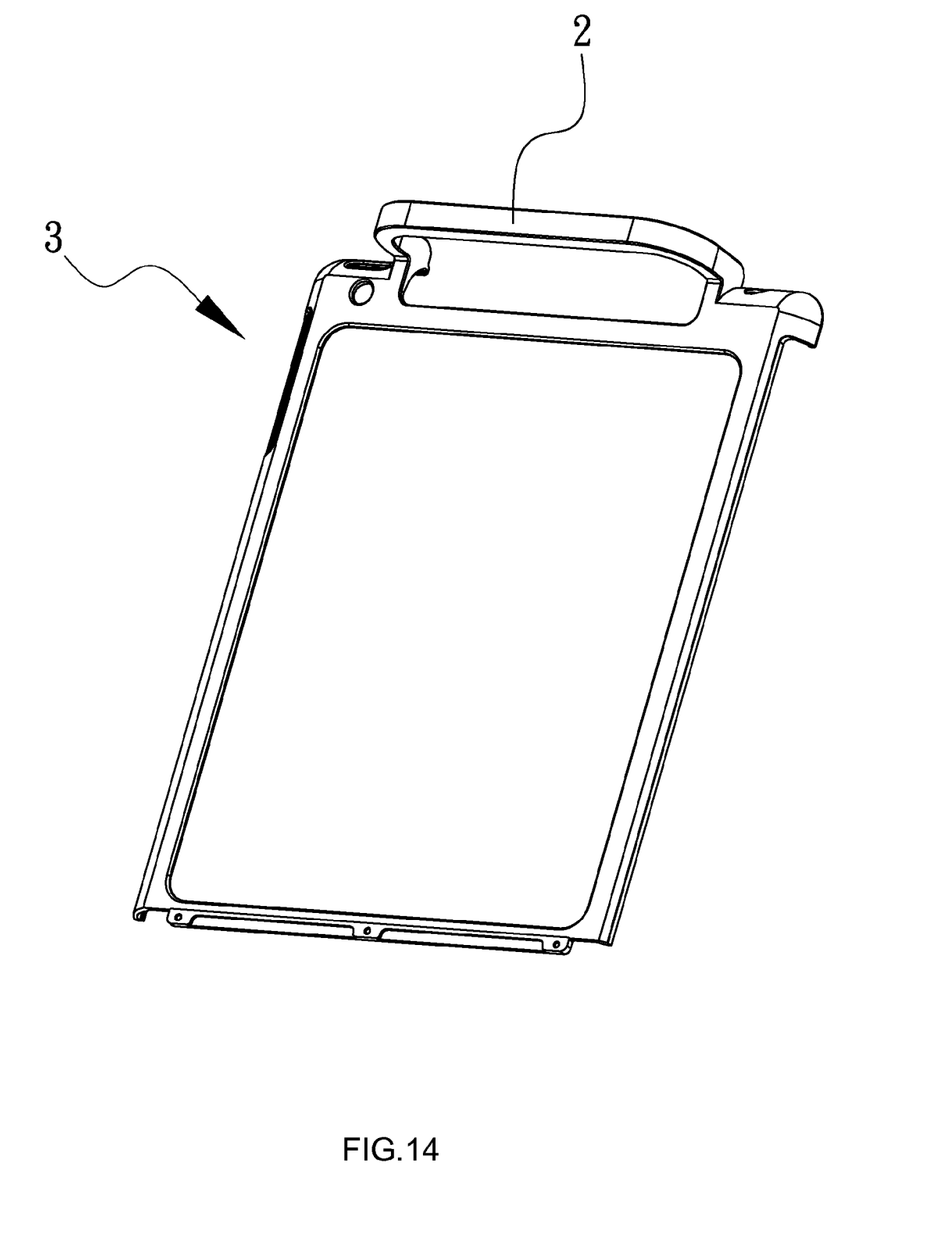
FIG. 14 is a schematic diagram illustrating a handle member according to the third preferred embodiment of the invention.
Figure 15:
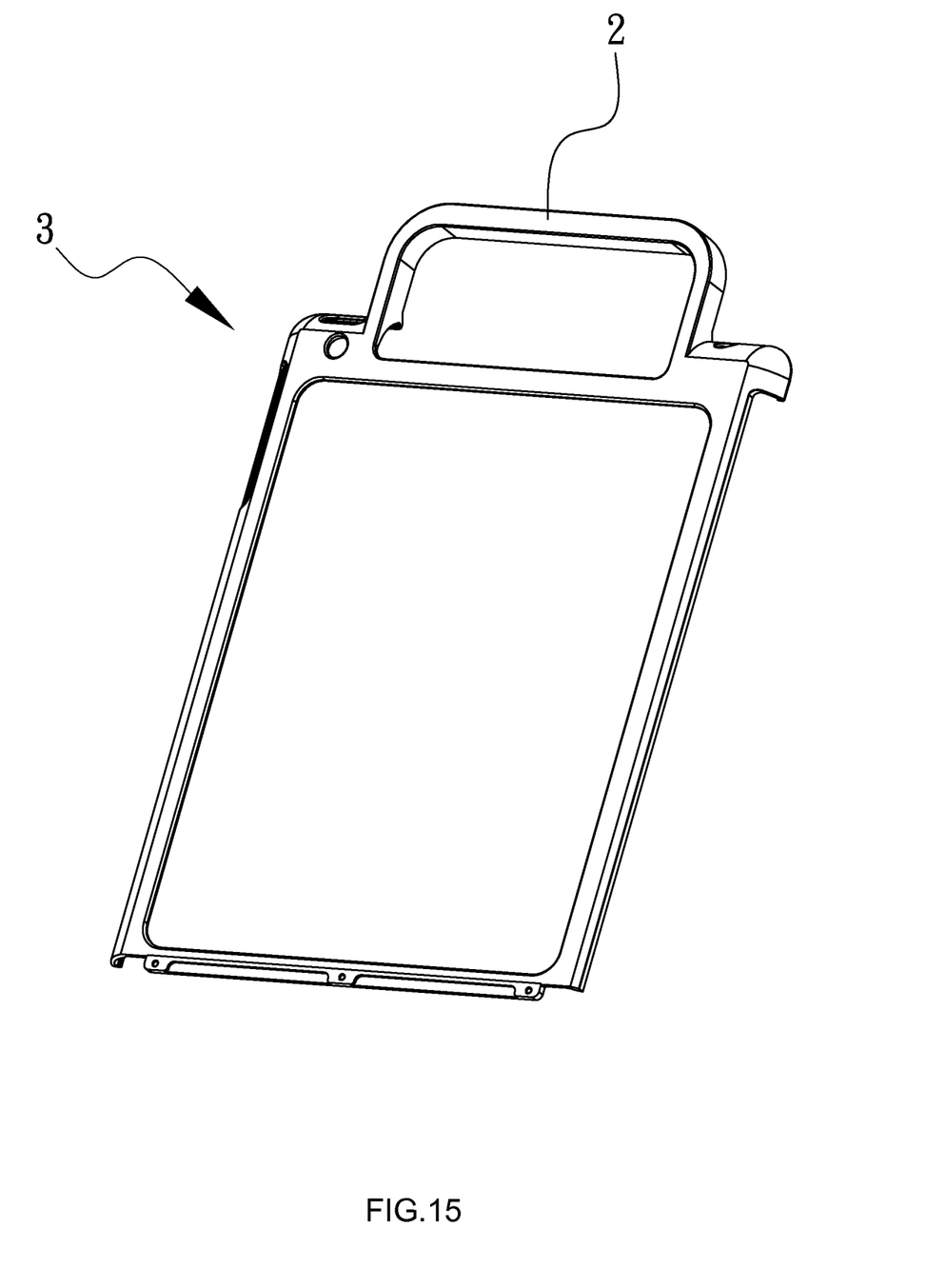
FIG. 15 is a schematic diagram illustrating an alternative handle member according to the third preferred embodiment of the invention.

A further embodiment provides a protective case, whose frame body is integrally formed with a handle member. An integrated handle member 2 extends from the frame body 3 and/or the sealing member 5 in a direction perpendicular to the bottom portion, as shown in FIG. 14, or parallel to the bottom portion, as shown in FIG. 15. The integrated construction makes the handle member 2 inclined at a predetermined fixed angle with respect to the frame body 3, without compromising the handling of the invention. This embodiment is of a simplified configuration and can significantly save the cost required for processing tabs 321, 322 and hinge parts 11, 12 shown in FIG. 7.

Figure 16:
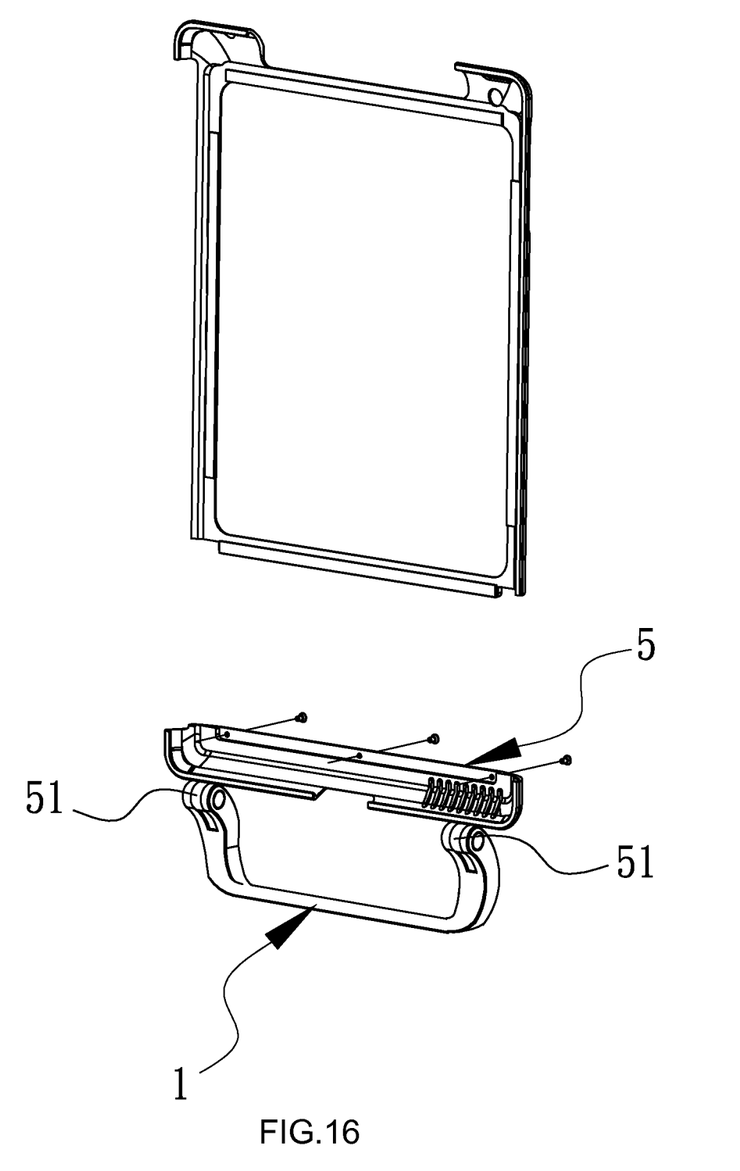
FIG. 16 is a schematic diagram illustrating a handle member according to the fourth preferred embodiment of the invention.

According to another embodiment shown in FIG. 16, the handle member 1 is mounted on the sealing member 5 via tabs 51. An alternative configuration, in which the protective case has two handle members on both sides of the frame, allows a user to conveniently hold a tablet mobile device with both hands during use. The invention also contemplates a configuration, in which the protective case has only one handle member mounted on the sealing member 5. In this case, the protective case is adapted for being carried up-side-down. It will be appreciated by those skilled in the art that the handle member may be provided with a ratchet gear engaging with corresponding ratchet pawl formed on the tab of the frame body, so as to control the handle member to move unidirectionally.

While the invention has been described with reference to the preferred embodiments above, it should be recognized that the preferred embodiments are given for the purpose of illustration only and are not intended to limit the scope of the present invention and that various modifications and changes, which will be apparent to those skilled in the relevant art, may be made without departing from the spirit and scope of the invention.

What is claimed is:

1. A protective case adapted for use on a tablet mobile device having a front face for displaying images, a rear face opposite to the front face, and four side faces connecting the front face and the rear face, the protective case comprising:
    a frame body, comprising a bottom portion for supporting the rear face, and at least one holding portion extending forwardly from the bottom portion and at least partially bent for lying on the front face;
    a sealing member comprising at least one assistant holding portion and adapted for surrounding and holding, in cooperation with the frame body, the tablet mobile device;
    a handle member mounted on the frame body and adapted for being held by a user's hand, wherein the handle member has a hinge part; and
    a protective sheet extending from the at least one holding portion and adapted for covering the front face of the tablet mobile device;
    wherein the bottom portion is formed with a perforated region;
    wherein the at least one holding portion includes an upper right side portion extended upward from an upper right side of the bottom portion, and an upper left side portion extended upward from an upper left side of the bottom portion, a pair of tabs being formed on the upper right side portion and the upper left side portion, respectively, each of the pair of tabs having a through hole, and the through holes of the pair of tabs being coaxially arranged, and the hinge part of the handle member being pivotally engaged with the pair of tabs via the through holes;
    wherein a shaft is interposed between the at least one holding portion of the frame body and the at least one assistant holding portion of the sealing member, wherein the shaft is fixed with the protective sheet.

2. The protective case adapted for use on a tablet mobile device according to claim 1, further comprising a protective sheet extending from the at least one holding portion and adapted for covering the front face of the tablet mobile device.

3. The protective case adapted for use on a tablet mobile device according to claim 1, further comprising a soft pad for covering the perforated region.

* * * * *